Nov. 19, 1957    J. J. PANIK    2,813,748
HEADER ASSEMBLY FOR VEHICLE CLOSURES
Filed Jan. 10, 1955

INVENTOR.
JOSEPH J. PANIK
BY
Wilson, Redrow, and Gaines
ATTORNEYS

United States Patent Office 2,813,748
Patented Nov. 19, 1957

2,813,748

HEADER ASSEMBLY FOR VEHICLE CLOSURES

Joseph J. Panik, Grosse Pointe Woods, Mich., assignor to Studebaker-Packard Corporation, Detroit, Mich., a corporation of Michigan Application January 10, 1955, Serial No. 480,680

10 Claims. (Cl. 296—44)

The present application relates to a header assembly for vehicle closures and more particularly to an improvement in the sealing means in such header assembly to be used around windows and especially around automobile door windows or the like. One of the outstanding features of the invention disclosed in this application is the provision of an improved and simplified yieldable rubber weather seal for use in the body of an automobile between the upper end of a vent wing framework and a roll down automobile door window, for instance, and the body of such automobile. An automobile to which this seal is especially suited is one having the modern so-called hard top convertible body but in the broader sense this seal may find application in true convertible automobile bodies as well.

The fact is readily appreciated by persons familiar with automobile body engineering that an effective window sealing means for the hard top convertible model body as well as other models has been long sought. The problem of design in designing and providing an effective weather seal beneath the roof for use in these particular vehicle body models is complicated by the fact that in these models there is an absence of the conventional fixed window frame which is ordinarily carried by the vehicle door across the upper end or edge of the window or windows in the door. Accordingly, the weather seal between the window and the roof must necessarily be carried in position by the roof frame in absence of there being available such a conventional window frame as noted, and hinged metal flipper bars or finish moldings are in prevailing use in this position.

An object of the present invention is to provide a novel and effective substitute for these so-called metal flipper bars or hinged finish moldings which are currently prevalent, such substitute comprising a composite rubber and metal structure of which none of the functional metal is exposed and only the rubber is exposed.

A further object of the invention is the provision of a predominantly rubber seal for header structure wherein the seal incorporates one door-engaging channel portion, one attachment portion, and a fixed intervening rolling fold providing a sealed juncture between the two portions and having the property of accommodating swinging movement of the same about a shifting hinge or swing axis.

A further object of the invention is to provide an unitary substantially one-piece seal for the parts of a vehicle closure header assembly which presents a continuous impervious wall between the parts which it seals.

Another object of the invention is the provision for use with a shifting axis type header assembly seal, of a set of one or more biasing springs which accommodate shift in the swing axis of the seal during operation of the same.

Further features, objects and advantages will either be specifically pointed out or become apparent when for a better understanding of the invention reference is made to the following written description taken in conjunction with the accompanying drawings in which:

Figure 1 is a side elevational representation of a modern automobile having its door header equipped with a window sealing means embodying the present invention;

Figures 2 and 3 are cross sectional elevational views looking rearwardly along the section lines 2—2 and 3—3 in Figure 1;

Figure 1:
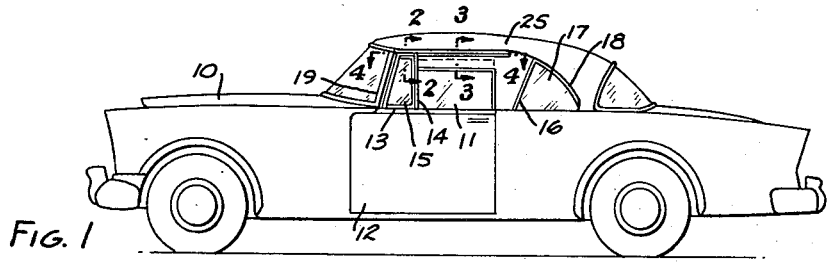

In Figure 1, a hard top convertible automotive vehicle 10 is shown on which the present seal invention is adapted for use, this vehicle being merely an illustrative example and it being understood that the use of the seal under other circumstances will be readily suggested to one familiar with the art. This vehicle 10 has a roll down type window panel 11 mounted for up and down movement in its own plane in a door 12 adapted to hinge at its forward edge for swinging movement in a familiar manner to open up or close the body of the vehicle 10. The door 12 terminates in a substantially horizontally disposed reveal member or garnish molding 13 at its upper end. A forward lateral guide channel for the window 11 is constituted by a division strip or mullion 14 carried by the door 12 and positioned to the rear of a familiar no-draft ventilator window or glass wing 15 pivoted to swing about a vertical axis in the plane thereof. The rearward edge of the roll down window 11 is engageable with a second guide member of channel section at 16 which carries a conventional rubber gasket for sealing with the window 11 and which constitutes a swinging forward frame member for a small sector-shaped rear side window 17. The forward frame 16 along with an arcuate frame member 18 bounds the rear window 17 and moves therewith in an arcuate path toward and away from the normal forward or closed position of the window 11. As previously noted in connection with this particular class of hard top convertible vehicle, there is no channel or window frame member provided across the upper end of the window in which the channel members 14 and 16 might ordinarily terminate as in the conventional sedan or coupe models of automobiles. It is to the provision of a header assembly sealing means intermediate the upper ends of the windows 15 and 17 and between the window 11 and an exterior roof panel 25 for the body of the automobile 10, that the present invention is especially directed although its use and adaptation to other types of vehicles is also contemplated. In particular, the sealing means will extend substantially between a windshield pillar 19 for a wraparound windshield in the body of the vehicle 10 and a point to the rearward of the normal fully closed position occupied by the channel member 16.

In Figures 2, 3, 4, and 5, the present improved sealing means for a header assembly is generally indicated at 20 and is adapted to be mounted along the underside of a frame 21 for the external roof stamping or panel 25 and which defines an upper cross extension or limit to the opening wherein the window panels 11, 15, and 17 are located. The sealing means 20 further extends forwardly over the top of the no-draft ventilator frame for the wing 15.

The exterior roof panel 25 has an inwardly turned horizontal lower platform 26 forming a basic door jamb structure which is rigidly attached as by means of support walls or the like to the interior composite frame structure 21 including a substantially trapezoidally shaped longitudinally extending metal channel member 27, a reinforcing channel member 29, and a garnish molding member 30 under which a sheet of headlining, not shown, may be clamped as appropriate; a drip molding or gutter structure 32 extends laterally of the door jamb from its base or attaching portion 31 which is spot welded to the under side of the platform portion 26 of the roof panel according to conventional practice such that the actual drip trough lies laterally outwardly of but in adjacency to the lower edge of the exterior roof panel 25.

The present sealing assembly means 20 includes a longitudinally extending strip of springy decorative metal 35 which may be stainless steel or other chrome coated metal, and which is carried by a yieldable and deformable weather strip 36 made of rubber, neoprene, elastic plastic, synthetic resin, or a like elastomeric material. The decorative strip 35 is either inherently non-corrosive or else coated as above so as to be resistant to deterioration from rust and from the weather, especially from water. The decorative strip 35 is substantially vertically disposed and has a longitudinally extending inwardly bent upper edge 37 and a longitudinally extending inwardly bent lower edge 38 rendering the strip self-retaining at one side of the seal structure 36. The seal structure 36 at a side opposite to the decorative strip 35 is arranged to engage a lower surface 39 of the molding 30 which is vertically spaced apart from but generally parallel to the horizontal platform portion 26 of the exterior roof panel 25. In the vicinity of the upper edge of the frame work for the vent window 15, a set of one or more outwardly acting bias spring elements 40 is provided each of which is in the form of a hair-pin spring having divergent fixed and free ends provided with a common coil 41 at their apex. The free end of each of the springs 40 as indicated at 42 has a disposition substantially in the plane of the coil 41, being tagent to the latter and flattened along the extreme seal engaging portion thereof. The fixed end 43 of each hair-pin spring 40 is horizontally disposed, being deflected at 45° out of the plane of the coil 41 and having an attaching portion joined thereto at 45° angularity and shaped in the form of a square loop at 44. The fixed end 43 of each spring is movable to the dotted line positions shown by dotted lines 43a and 43b to accommodate corresponding deflectable movement of the coil 41 and the free end 42 about the loop 44 as a center.

The weather strip 36 has a downwardly open substantially channel shaped portion of which the opposed sides or walls are integrally provided with an inwardly directed set of door engaging opposed lips 46 and 47. The weather strip 36 also includes a generally horizontally disposed planar attaching portion 48, to the underside of which a bifurcated metal strip or locating stamping 49 is held which receives each square loop 44 of the hair-pin springs 40 to prevent slipping of the springs and twisting of the loops in their own planes. The upper side of the attaching portion 48 is provided with a set of longitudinally extending serrations or corrugations 51 and at the outer edge thereof is joined leak-proofed to the channel shaped portion 45 by means of a continuous rolling fold 50 preferably made of the same material as the rubber seal 36 and integrally joining the two portions 45, 48 thereof together for relative swinging movement. The weather strip 36 including its opposed door engaging lips 46 and 47 is of a uniform cross section readily lending itself to production by means of an extrusion process common in the rubber and plastics industry, and, in conformity with the prevailing practices in this industry, a longitudinally extending metal channel 53 may be self-containedly incorporated within the non-metallic channel portion 45 contemporaneously with the extrusion process. As extruded the two principal non-metallic portions 45 and 48 of the seal 36 are disposed with relation to one another in a relaxed position so as to include an angle of approximately 30° measured at 52 at the apex of the rolling fold 50 therebetween.

The attaching portion 48 of the rubber seal 36 is secured to the under side of the gutter member 32 such that the serrations 51 in the upper face of the attaching portion 48 form a labyrinth type seal or joint preventing leakage between the various spaced apart locations of longitudinal line contact between the attaching portion 48 and the opposed surface of the attaching flange 31 of the rain trough 32. If and when leakage occurs through any one location of intended line contact due to an undesired local misalignment, the included serration or valley between such line and the next successive line inwardly thereof serves as a water trap. Such securement between the portions 48 and the flange 31 is effected by means of a plurality of metal screws 61 which are passed through the attaching portion 48 and are inserted vertically in threaded engagement into appropriate bulged openings in the roof frame 21. The screws 61 in the vicinity of the set of hair-pin springs 40 serve a dual function in that additionally they pass through the square loops 44 of the springs to clamp the square loops and their locating stamping 49 to the underside of the attaching portion 48 of the seal 36. The roll down window 11 being physically located to the rear of the general vicinity of the springs 40, has a channel section 60 which is internally sealed to the upper edge thereof and which is externally sealed along its opposite outside edges by means of the deflectable opposed lips 46 and 47 within the channel shaped portion 48 of the seal 36.

The vent wing 15 and its associated frame-work is located in the immediate vicinity of the hair-pin retractor springs 40 and includes an inwardly opening border channel 62 which clamps a seal of non-metallic material 63 to the outer edges of the wing and which pivots with the latter in the vent wing frame-work. The vent wing frame work itself includes a downwardly open fixed metal channel section 66 in which a rubber seal 64 is received having a downwardly depending lip engaging one edge of the vent wing border 62 in closed position of the glass wing 15. The frame work 66 is fixed solidly to the door 12 whereas the vent wing 15 and its border channel 62 are pivoted to swing out of the plane of the door 12 and its door jamb with which the latter normally coincides at 68.

Figures 2, 3:
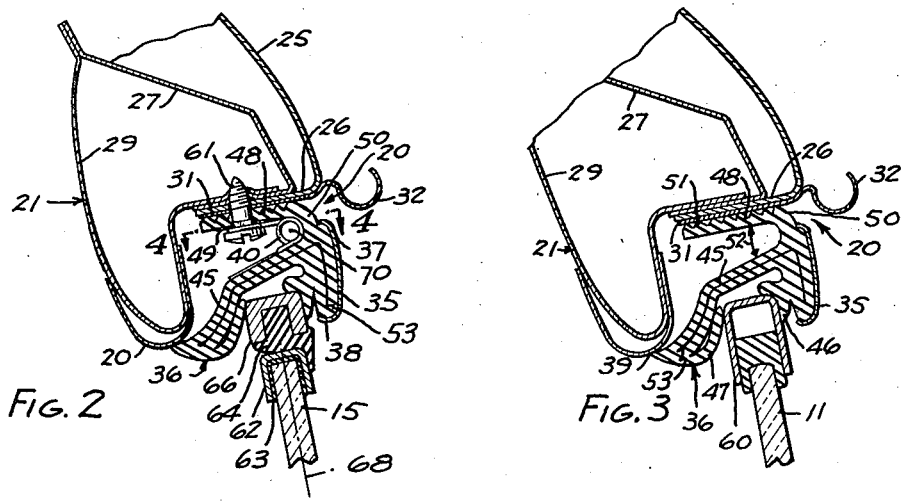
Figures 4, 5, 6:
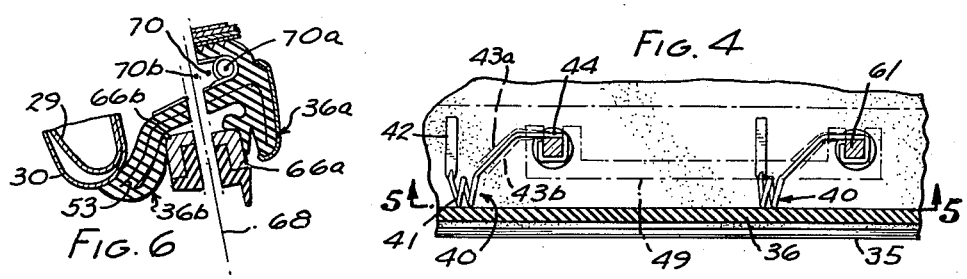
Figure 4 is a section in plan taken along the lines 4—4 in Figure 2.
Figure 5 is a section in side elevation taken along the lines 5—5 of Figure 4.
Figures 6 and 7 are similar to Figure 2 but show the present sealing means and the adjacent edge of a roll down window in different positions of relative adjustment and engagement during installation and operation of the sealing means.
Figure 7:
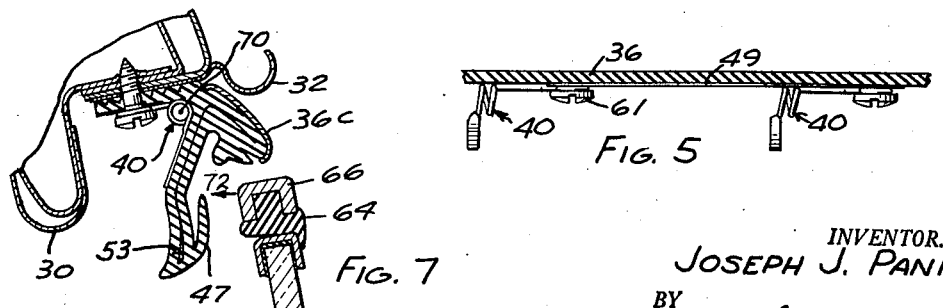

In Figures 6 and 7 the seal means is shown in various positions of adjustment and operation readily comparable to its closed position shown in solid lines in Figure 2. In the event that the door 12 and the vent wing frame work 66 happens to be out of coincidence with the plane 68 of the door jamb so as to be laterally outwardly thereof, the frame work just mentioned will assume the displaced position 66a, Figure 6, with relation to the reference plane 68 so as to engage the lip 46 in a position whereby the rolling hinge portion 50 of the seal means 36 flexes about a displaced hinge axis 70a slightly outside of the normal hinge axis indicated at 70 for the seal 36. Contrary-wise if the assembly of the vehicle door 12 is such that the plane of the vent wing frame work occupies an inwardly off-set position 66b, Figure 6, then the rubber seal assumes a dotted line position shown by the dotted lines 36b in which it is laterally displaced from its point of engagement with the molding 30 to a new inward position of contact at 39b. In the latter instance the hinge axis for the rolling fold 50 is effectively shifted to an inner location at approximately 70b, Figure 6. This hinge axis 70 and its extreme positions 70a and 70b are assumed to be located in the center of the coil 41 of the coil spring 40 and are approximately ⅛ inch apart from one another with maximum variation ⅛ inch overall.

The rolling fold 50 additionally accommodates slight variatitons in the resulting vertical level of the vent wing frame 66 as can be observed from the vertical levels of 66a and 66b in Figure 6 such that in production line work the vent wing frames from one vehicle body to another may vary in their relative height within the door jamb as well as vary in their position of displacement with respect to the plane 68 of the door jamb.

The hair-pin springs 40 normally tend to bias and force the weather strip 36 into its relaxed position as shown at 36c, Figure 7, and this position is therefore taken by the seal at all times that the door 12 is opened. Closure of the door 12 results in a corresponding closing movement of the vent wing frame 66 carried thereby which, in the direction of an arrow 72 Figure 7, causes an initial contact of engagement between the frame and the inner lip 47 in the channel portion 45 of the seal. Continued closing movement of the door and the vent wing frame 66 results in the assumption by the parts their solid line positions according to Figure 2, wherein the opposed lips 46 and 47 engage the opposite edges both of the vent wing frame 66 and of the rolled down window border 60, Figure 3.

It will be noted that the rolling fold 50 of the rubber seal 36 and also the gutter 32 of the drip molding intersects the plane of the planar attaching portion 48 of the rubber seal. It will be further noted that the bent upper edge 37 of the decorative strip 25 terminates at a point in substantial juxtaposition below the plane of the attaching portion 48 such that the rolling fold 50 is unexposed to direct rays from the sun and is protected to a large extent from direct weathering. In such location, the rolling fold 50 even though being subject to constant flexure when the vehicle door is opened and closed, occupies a sheltered and protected pocket rendering it relatively free from ozone deterioration and from other checking and deteriorating effects of the weather. The rolling fold, continuously reinforced by and backed up by the outwardly biasing hair-pin spring coils 41, is effective first to define a hinge axis for the swinging channel portion 45, is effective to accommodate shifting movements of this axis inwardly and outwardly, and also effective to accommodate slight vertical displacement and mis-alignment of the door 12 without the attendant gaps or avenues for leakage over the top of the door glass or vent wing frame work. The non-metallic channel portion 45, rigidified of its full length by means of the functional metal reinforcing channel 53 embedded therein, is arranged to swing against the bias of the springs 40 from the position of Figure 7 into the position of Figure 2 whenever the door and vent wing frame work 66 is swung inwardly to occupy and close the door jamb, regardless of whether the roll down window 11 happens to be up or down at the time of door closure. Thus when the door is closed as in Figure 2, it is evident that in the vicinity of the vent window frame work 66 the seal 36 assumes the position of Figures 2 and 3 regardless of whether the window 11 is positioned upwardly as in Figure 3 or at a downward or an intermediate position as particularly shown in Figure 1. In the latter instance as soon as the window 11 is rolled upwardly it engages the channel section 45 in the solid line Figure 3 position of the latter so as to be sealed at the top edge thereof by means of the opposed lips 46, 47.

As herein disclosed the base portion 48 of the rubber seal 36 is shown to have the rolling fold 50 affixed at the outer edge thereof and to be free at the inner edge thereof. It is evident that an additional portion of rubber may be integrally or separately joined to the inner edge of the attaching portion 48 so as to line the vertical wall portion of the door jamb between the platform portion 26 and the vertically displaced or downwardly offset surface 39 of the garnish molding 30. So also the drawing shows two hair-pin springs 40 for restoring the seal 36 outwardly to its fully relaxed position when the door 12 is opened but self-evidently a greater or lesser number of springs 40 for this effect may be located in the included angle 52 between the portions of the seal 36 in the vicinity of the vent wing frame 66. The strip of metal 35 which is preferably of a springy construction so as to be self-sustaining between its opposite edges 37 and 38, is shown to have the dual function of decorating the seal 36 externally and of preventing weathering and deterioration of one leg of the channel 45 and a portion of the rolling fold thereof, but indeed it is not essential to the invention that the strip 35 be employed and in certain instances it may be found advantageous to omit the same for the sake of economy or for other reasons.

Variations within the spirit and scope of the invention described are equally comprehended by the foregoing description.

What is claimed is:

1. In a door header assembly for a door jamb, a laterally protruding rain gutter structure adapted to be secured to one of two vertically spaced portions of the door jamb, a unitary flexible seal having a depending channel portion, a generally horizontally disposed attaching portion and an intervening rolling fold integrally interconnecting said two portions to provide a shifting hinge axis therefor incident to swinging movement therebetween, said attaching portion having longitudinally extending serrations in the upper surface thereof, and means for detachably mounting the seal to said door jamb whereby the serrations of the attaching portion engage the under-side of the gutter structure to form a watertight labyrinth joint, and with the position of the seal such that both the gutter structure and the rolling fold of the seal intersect the plane of the attaching portion of the latter in laterally spaced apart locations to provide shelter for and to prevent weathering of the rolling fold, the opposed walls of said channel portion depending therefrom in a manner whereby one wall is engageable with the other of said vertically spaced apart door jamb portions.

2. In a door header assembly for vehicle door jamb structure, a unitary flexible seal having a channel portion, a generally horizontally disposed attaching portion and an intervening rolling fold integrally interconnecting said two portions to provide a shifting hinge axis incident to swinging movement therebetween, said attaching portion having longitudinally extending serrations in the upper surface thereof, means for detachably mounting the seal to said door jamb structure whereby the serrations engage an undersurface thereof to form a watertight labyrinth joint, the opposed walls of said channel portion depending therefrom in a manner whereby one wall is externally engageable with an undersurface of the door jamb structure, and a decorative metal strip externally carried by the other of the opposed walls.

3. In a door header assembly for a door jamb, a laterally protruding gutter structure adapted to be permanently secured to the door jamb, and a unitary flexible seal having a channel portion, a generally horizontally disposed attaching portion and an intervening rolling fold integrally interconnecting said two portions to provide a shifting hinge axis about which the two portions are relatively swingable, said attaching portion having means for detachably securing the same to the door jamb with its upper surface in engagement with the underside of said gutter structure in a position whereby both the gutter structure and the rolling fold of the seal intersect the plane of the attaching portion of the latter to prevent weathering of the rolling fold.

4. In a door header assembly for a door jamb, a laterally protruding gutter structure adapted to be permanently secured to the door jamb, and a unitary flexible seal having a channel portion, a generally horizontally disposed attaching portion and an intervening rolling fold integrally interconnecting said two portions to provide a shifting hinge axis about which the two portions relatively swing, the channel portion of the seal having a self-contained metal stiffening channel therewithin and substantially coextensive in length therewith, said attaching portion having an upper surface and having means for detachably securing the same to the door jamb with said upper surface in engagement with the underside of said gutter structure in a position whereby both the gutter structure and the rolling fold of the seal intersect the plane of the attaching portion of the latter to prevent weathering of the rolling fold.

5. In a door header assembly for a door jamb, a laterally protruding gutter structure adapted to be permanently secured to the door jamb, a unitary flexible seal having a channel portion, a generally horizontally disposed attaching portion and an intervening rolling fold integrally interconnecting said two portions to provide a shifting hinge axis about which the two portions relatively swing, said attaching portion having an upper surface and having means for detachably securing the same to the door jamb in engagement with the underside of said gutter structure in a position whereby both the gutter structure and the rolling fold of the seal intersect the plane of the attaching portion of the latter to prevent weathering of the rolling fold, and hair-pin springs supported by the last named means behind the rolling fold and tending to open said fold.

6. In a door header assembly for a door jamb, a laterally protruding gutter structure adapted to be permanently secured to the door jamb, and a unitary flexible seal having a channel portion, a generally planar attaching portion and an intervening rolling fold integrally interconnecting said two portions to provide a shifting hinge axis about which the two portions relatively swing, said attaching portion having means for detachably securing the same to the door jamb in a position whereby both the gutter structure and the rolling fold of the seal intersect the plane of the attaching portion of the latter to prevent weathering of the rolling fold.

7. In a door header assembly for a door jamb, a unitary flexible seal incorporating a channel portion, a generally horizontally disposed attaching portion and an intervening rolling fold integrally interconnecting said two portions to provide a shifting hinge axis of swing therebetween, said attaching portion having longitudinally extending serrations in the upper surface thereof, means for detachably mounting the seal to said door jamb whereby the serrations engage a surface thereof to form a watertight labyrinth joint with the position of the seal such that the jamb extends laterally of the point at which the rolling fold of the seal intersects the plane of the attaching portion of the latter to prevent weathering of the rolling fold, and hair-pin type springs behind the fold having two degrees of freedom for biasingly accommodating said hinge axis shift and said hinging movement about said axis.

8. In a door header assembly for a door jamb, a laterally protruding rain gutter member adapted to be permanently secured to the door jamb, a unitary flexible seal incorporating a channel portion, a generally horizontally disposed attaching portion and an intervening rolling fold integrally interconnecting said two portions to provide a shifting hinge axis of swing therebetween, said attaching portion having longitudinally extending serrations in the upper surface thereof, means for detachably mounting the seal to said door jamb whereby the serrations engage the underside of the gutter member to form a watertight labyrinth joint and in a position of the seal such that both the gutter structure and the rolling fold of the seal intersect the plane of the attaching portion of the latter to prevent weathering of the rolling fold, and spring means behind the fold having two degrees of freedom for biasingly accommodating hinge axis shift and swinging movement of the fold as aforesaid, said channel portion of the seal being downwardly open and having one of the depending opposed walls thereof adapted to receive an external longitudinal strip of decorative metal.

9. In a door header assembly for a door jamb, a laterally protruding rain gutter member adapted to be permanently secured to a first surface of the door jamb, a unitary flexible seal incorporating a channel portion, a generally horizontally disposed attaching portion and an intervening rolling fold integrally interconnecting said two portions to provide a shifting hinge axis of swing therebetween, said attaching portion having longitudinally extending serrations in the upper surface thereof, means for detachably mounting the seal to said door jamb whereby the serrations engage the underside of the gutter member to form a watertight labyrinth joint and in a position of the seal such that both the gutter structure and the rolling fold of the seal intersect the plane of the attaching portion of the latter to prevent weathering of the rolling fold, and springs behind the fold having two degrees of freedom for biasingly accommodating hinge axis shift and swinging movement of the fold as aforesaid, said channel portion being downwardly open with one of the depending opposed walls thereof engageable with a second surface of the door jamb when the seal is swung to its innermost position.

10. In a door header assembly for a door jamb, a unitary flexible seal incorporating a channel portion, a generally horizontally disposed attaching portion and an intervening rolling fold integrally interconnecting said two portions to provide a shifting hinge axis of swing therebetween, said attaching portion having longitudinally extending serrations in the upper surface thereof, and means for detachably mounting the seal to said door jamb whereby the serrations engage a first surface therewithin to form a watertight labyrinth joint, and in combination therewith, hair-pin type spring means behind the fold having two degrees of freedom for biasingly accommodating hinge axis shift and swinging movement of the fold, said channel portion of the seal being downwardly open and having one of the depending opposed walls thereof adapted to receive a longitudinal strip of decorative metal ornamentation and the other engageable with a second surface of the door jamb when the seal is swung to an extreme position.

References Cited in the file of this patent

UNITED STATES PATENTS

| | | |
|---|---|---|
| 2,267,433 | Tea | Dec. 23, 1941 |
| 2,556,775 | Oswald | June 12, 1951 |
| 2,622,286 | Beck | Dec. 23, 1952 |
| 2,649,329 | Bratton et al. | Aug. 19, 1953 |
| 2,687,914 | Schrum | Aug. 31, 1954 |
| 2,737,412 | Smith et al. | Mar. 6, 1956 |

FOREIGN PATENTS

| | | |
|---|---|---|
| 634,860 | Germany | Sept. 5, 1936 |
| 898,714 | Germany | Dec. 3, 1953 |